June 10, 1952 — A. A. LOPES ET AL — 2,600,060

BUMPER FOR MOTOR VEHICLES

Filed Oct. 26, 1948

INVENTORS:
Antonio Augusto Lopes and Américo Marmo

BY

ATTORNEY

Patented June 10, 1952

2,600,060

UNITED STATES PATENT OFFICE 2,600,060

BUMPER FOR MOTOR VEHICLES

Antonio Augusto Lopes and Americo Marmo,
Sao Paulo, Brazil

Application October 26, 1948, Serial No. 56,528
In Brazil November 3, 1947

2 Claims. (Cl. 293—85)

This invention relates to bumpers for motor vehicles and is applicable to rear as well as front bumpers including the usual or any approved types of impact members or buffer bars extending crosswise of the vehicles in front of the front wheels and in back of the rear wheels.

The types of bumpers in common use have these impact members or buffer bars connected to the sills of the chassis by spring members, usually of the arcuate leaf spring type. These spring members, as a result of considerable impact upon the buffer bar, frequently become permanently set in abnormal shape and considerable difficulty is experienced in bending them to normal shape. As a result, one may observe many motor vehicles on the streets and highways with bumpers out of alignment and in such condition as to not serve efficiently when subjected to another impact or blow.

The principal object of the invention is to provide mountings for bumper impact members or buffer bars which are more efficient than those in common use in that they utilize the usual or any approved spring mountings for absorbing slight shocks and provide a supplemental device for absorbing greater shock than can be absorbed by mountings of the first mentioned type.

Other objects and advantages will be apparent from the following detailed description of a preferred embodiment of our invention, taken in connection with the accompanying drawing, forming a part of this specification, and in which drawing.

Figure 1:
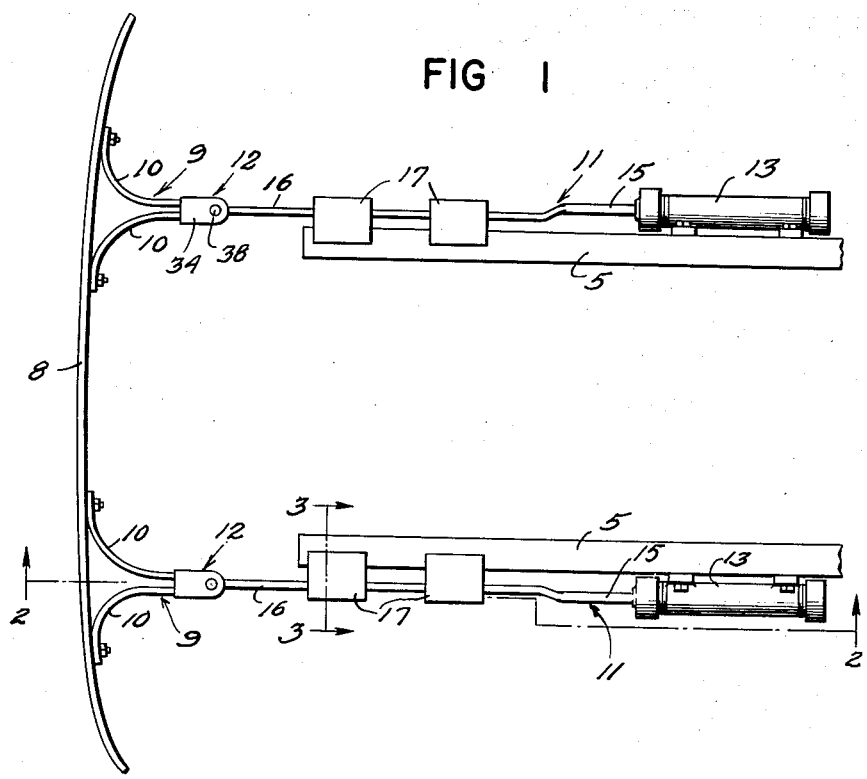
Fig. 1 is a fragmentary plan view showing the longitudinal sills or side bars of a motor vehicle chassis equipped with a bumper constructed according to our invention.
Figure 2:
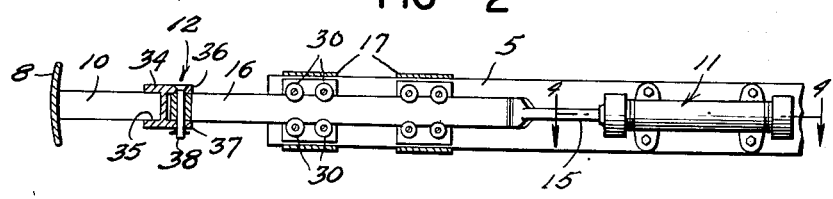
Fig. 2 is a sectional view on the line 2—2 of Fig. 1.

In the drawing is shown the longitudinal sills or side bars 5 of a vehicle chassis which may be of any suitable type, such as of pressed steel channels including a web portion 6 and upper and lower inwardly directed flanges 7.

The bumper comprises any suitable type of impact member, such as a buffer bar 8; primary spring mountings 9 which, in the example shown, are each composed of arcuate leaf springs 10; secondary shock absorbing mountings 11, subsequently described more in detail; and flexible connections 12 between each companion primary mounting 9 and secondary mounting 11, in the example shown, serving also to provide sockets for the engaging ends of the leaf springs 10.

In the example shown, the secondary shock absorbing mounting is preferably of the hydraulic cushion type and comprises a cylinder 13 disposed with its axis extending longitudinally of the sill; a piston 14 in the cylinder; a piston rod 15 extending from the piston toward the buffer bar 8; a normally straight bar 16 preferably in the form of a leaf spring connected to the end of rod 15 opposite piston 14; brace means 17, for the leaf spring, secured to the sill 5; and expansive equalizing coil springs 18 and 19 in cylinder 13 for normally centering the piston in the cylinder.

The cylinder 13 preferably comprises a main body portion 20; a closed end cap 21 at one end of body portion 20, preferably adjustable as by screw threaded engagement therewith; and a piston rod accommodating cap 22 at the other end of the body portion 20, also preferably adjustable as by screw threaded engagement therewith.

The spring 18, in the example shown, is interposed between the piston 14 and cap 21 and spring 19 is interposed between the piston and cap 22. By adjusting these caps the action of the springs may be adjusted as well as the normal position of the piston within its cylinder. While the springs are primarily intended to return the piston to a normal position in the cylinder, after the bumper has been relieved of pressure from an engaging object the spring 18 may aid in absorbing impact upon the buffer bar 8; and the spring 19 may to some extent absorb shock of starting if the vehicle is being towed through a line or device connected to the buffer bar 8. By adjusting the caps 21 and 22 toward each other, these shock absorbing characteristics of the springs may be increased. Also by adjusting the caps in the same direction the relative position of the piston in the cylinder may be changed, and hence the normal position of the buffer bar with respect to the vehicle chassis may be changed.

The cylinder 13 may be fitted or partly filled with a liquid 25 part of which may be transferred from one side of the piston to the other in any suitable manner, such as by the provision of a port 26 extending transversally through the piston.

Figure 3:
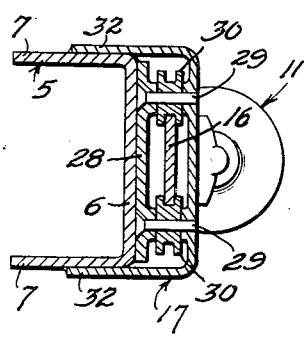
Fig. 3 is an enlarged sectional view on the line 3—3 of Fig. 1.
Figure 4:
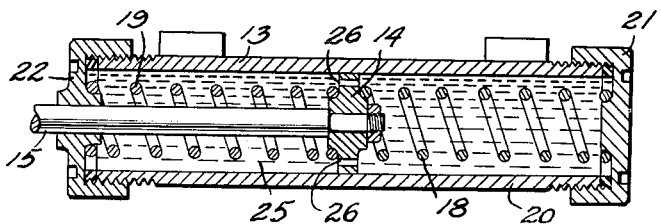
Fig. 4 is an enlarged sectional view on the line 4—4 of Fig. 2.

When the buffer bar is subjected to impact, the bar 16 is under compression and the brace means 17 is provided to guide it in its movement longitudinally of the sill 5 and to prevent lateral distortion. Each brace means preferably comprises, as shown more in detail, in Fig. 3, a base plate 28 secured to the web 6 in any suitable manner; outstanding dead axles 29 adjacent the upper and lower edges of plate 28; grooved rollers 30 on the axles, receiving the upper and lower edges of the bar 16; and an embracing plate 31 supporting the ends of axles 29 opposite plate 28 and having flanges 32 secured to the flanges 7 as by welding or in any suitable manner. Any number of these brace means may be disposed in spaced relation longitudinally of the sill, two being shown at each sill, by way of example.

The flexible connections 12 may each comprise a body portion 34 providing a socket 35 for the ends of arcuate leaf springs 10, opposite the buffer bar and upper and lower perforated ears 36 and 37, respectively, and a pintle 38 carried by these ears, the end of the companion bar 16 being provided with a sleeve portion 39 encircling the pintle 38.

In operation, the bumper serves to absorb minor shock through the primary spring mountings 9, altho even minor impact may be absorbed to some extent by the shock absorbing mounting 11. Major shocks are, however, taken care of by the latter so as to not place too great a strain upon the mountings 9. The flexible connections 12 permit the buffer bar to take abnormal positions as where impact comes upon the bar to one side or the other of the center of the bar and in the event of a severe blow, the bars 16 may yield laterally between the flexible connections 12 and the brace means 17 as is clear from the foregoing description and an inspection of Fig. 1, without transmitting a bending force to the piston rod 15, or the parts of any suitable secondary shock absorbing mounting which may have connection therewith.

We claim:

1. In a bumper for a motor vehicle, said bumper being adapted for attachment to the longitudinal sills, having upper and lower faces, of the chassis of said vehicle, the combination of an impact member extending crosswise of the chassis, and a shock absorber mounting carried by each sill, each of said mountings comprising a shock absorbing device, a normally substantially straight imperforate leaf spring extending longitudinally of the adjacent sill and having one of its end portions acting upon said shock absorbing device and its other end portion operatively connected with said impact member, and brace means for said leaf spring comprising a plurality of spaced-apart flanged rollers with said leaf spring riding along said rollers and within the spaces between said flanges, pivots for said rollers and a housing for said rollers said housing being open at both ends, and comprising an embracing plate, provided with bearings for like ends of said pivots, and flanges, said flanges being secured to said upper and lower faces of said sills.

2. In a bumper for a motor vehicle, said bumper being adapted for attachment to the longitudinal sills, having upper, lower and side faces, of the chassis of said vehicle, the combination of an impact member extending crosswise of the chassis, and a shock absorbing mounting carried by each sill, each of said mountings comprising a shock absorbing device, a normally substantially straight imperforate leaf spring extending longitudinally of the adjacent sill and having one of its end portions acting upon said shock absorbing device and its other end portion operatively connected with said impact member, and brace means for said leaf spring comprising a plurality of spaced-apart flanged rollers with said leaf spring riding along said rollers and within the spaces between said flanges, pivots for said rollers, a housing for said rollers said housing being open at both ends, and comprising an embracing plate, provided with bearings for like ends of said pivots, and flanges, said flanges being secured to said upper and lower faces of said sills, and a base plate having bearings receiving the other like ends of said pivots and secured to said side wall of said sill and within said housing.

ANTONIO AUGUSTO LOPES.
AMERICO MARMO.

REFERENCES CITED

The following references are of record in the file of this patent:

UNITED STATES PATENTS

| Number | Name | Date |
|---|---|---|
| 1,302,279 | Barnett | Apr. 29, 1919 |
| 1,496,112 | Banschbach | June 3, 1924 |
| 1,528,617 | Klotz | Mar. 3, 1925 |
| 1,799,065 | Rohm | Mar. 31, 1931 |
| 1,855,977 | Llobet | Apr. 26, 1932 |
| 1,925,461 | Ridge | Sept. 5, 1933 |
| 2,404,931 | Somervell | July 30, 1946 |